United States Patent
Lei

(10) Patent No.: US 10,484,871 B2
(45) Date of Patent: Nov. 19, 2019

(54) METHOD AND DEVICE FOR TRANSMITTING VERIFICATION INFORMATION

(71) Applicant: SHENZHEN SKYWORTH-RGB ELECTRONIC CO., LTD., Shenzhen (CN)

(72) Inventor: Beiyi Lei, Shenzhen (CN)

(*) Notice: Subject to any disclaimer, the term of this patent is extended or adjusted under 35 U.S.C. 154(b) by 412 days.

(21) Appl. No.: 15/413,422

(22) Filed: Jan. 24, 2017

(65) Prior Publication Data

US 2017/0272947 A1 Sep. 21, 2017

Related U.S. Application Data

(63) Continuation of application No. PCT/CN2016/076753, filed on Mar. 18, 2016.

(30) Foreign Application Priority Data

Mar. 18, 2016 (CN) .......................... 2016 1 0161881

(51) Int. Cl.
*H04W 12/06* (2009.01)
*H04W 4/06* (2009.01)

(52) U.S. Cl.
CPC ............. *H04W 12/06* (2013.01); *H04W 4/06* (2013.01)

(58) Field of Classification Search
CPC ....... H04W 12/06; H04W 4/06; H04W 12/02; H04W 84/12
See application file for complete search history.

(56) References Cited

U.S. PATENT DOCUMENTS

| 5,521,940 A * | 5/1996 | Lane ....................... H03M 7/30 370/474 |
| 7,716,559 B2 * | 5/2010 | Champel ............... H04L 1/0041 714/776 |
| 2003/0048784 A1 * | 3/2003 | Murai .................... H04L 12/18 370/390 |
| 2007/0223533 A1 * | 9/2007 | Kirrmann ................ H04L 1/22 370/469 |

(Continued)

*Primary Examiner* — Kenneth W Chang
(74) *Attorney, Agent, or Firm* — W&K IP

(57) ABSTRACT

A method and a device for transmitting verification information are disclosed. The method includes following steps: separating the verification information into multiple sub-verification information; numbering the multiple sub-verification information of the verification information in accordance with sequence numbers of the multiple sub-verification information in the verification information; generating sets of multicast frames according to the multiple sub-verification information and the sequence numbers of the multiple sub-verification information; selecting one set of multicast frames to be filled with the length of the verification information; transmitting generated sets of multicast frames, when the overall length of the sub-verification information in the sets of multicast frames received by the recipient, equating to the length of the verification information in the sets of multicast information, recombining the sub-verification information to obtain the verification information according to the sequence numbers of the sub-verification information. A device for transmitting verification information are also disclosed.

12 Claims, 12 Drawing Sheets

(56) References Cited

U.S. PATENT DOCUMENTS

| | | | |
|---|---|---|---|
| 2009/0232140 A1* | 9/2009 | Kitajima | H04L 49/1523 370/394 |
| 2012/0026931 A1* | 2/2012 | Wentink | H04L 1/1671 370/312 |
| 2018/0323995 A1* | 11/2018 | Lu | H04W 48/10 |

* cited by examiner

METHOD AND DEVICE FOR TRANSMITTING VERIFICATION INFORMATION

CROSS-REFERENCE TO RELATED APPLICATIONS

This application is a continuation of International Patent Application No. PCT/CN2016/076753 with a filing date of Mar. 18, 2016, designating the United States, now pending, and further claims priority to Chinese Patent Application No. 201610161881.4 with a filing date of Mar. 18, 2016. The content of the aforementioned application, including any intervening amendments thereto, are incorporated herein by reference.

TECHNICAL FIELD

The present invention relates to the field of internet technology, and in particular to a method and device for transmitting and receiving verification information.

BACKGROUND OF THE PRESENT INVENTION

With the development of Internet technology, Wi-Fi technology has been widely applied in our daily lives. When coming into the cafe or restaurant, people usually ask for a password for accessing Wi-Fi. Wi-Fi is all around us.

Currently, intelligent home is growing vigorously, and Wi-Fi technology is also widely applied in the field of intelligent hardware. Since some Wi-FI devices are lacking of screens, inputting keys etc, users cannot input the verification information to routers. At present, other function devices having screens and inputting keys may transmit verification information to the router via a special transport protocol, then the router will transmit the verification information to the Wi-Fi devices lacking of screens, input keys etc. However, the aforementioned method needs special transport protocol, and most Wi-Fi devices lacking of screens, input keys etc couldn't adopt the special transport protocol, that means, the aforementioned method is limited in range of uses, and not applicable to all Wi-Fi devices.

SUMMARY OF PRESENT INVENTION

The present invention discloses a method and device for transmitting verification information, aims to solve the problem that the method for Wi-Fi devices lacking of screens, input keys etc accessing Wi-Fi is not applicable to all Wi-Fi devices.

To realize the above aim, the present invention provides a method for transmitting verification information including: separating verification information into multiple sub-verification information, and numbering the multiple sub-verification information according to sequence numbers of the multiple sub-verification information in the verification information; generating sets of multicast frames according to the multiple sub-verification information and sequence numbers of the multiple sub-verification information; selecting one set of multicast frames to be filled with the length of the verification information; transmitting generated sets of multicast frames, when the overall length of the sub-verification information in the generated sets of multicast frames received by the recipient equating to the length of the verification information in the sets of multicast frames, recombining the sub-verification information according to the sequence numbers of sets of multicast frames to obtain the verification information.

Preferably, the step of transmitting sets of multicast frames includes: adding identity information into the sets of multicast frames; transmitting the sets of multicast frames after adding identity information into the sets of multicast frames; when the recipient receives the identity information from the sets of multicast frames, then obtaining the sub-verification information from the sets of multicast frames and recombining the sub-verification to obtain the verification information according to the sequence numbers of sets of multicast frames carrying the identity information when overall length of the sub-verification information equating to the length of the identity information in the sets of multicast frames.

Preferably, the step of generating sets of multicast frames according to the multiple sub-verification information and sequence numbers of the multiple sub-verification information includes: calculating packet length information successively according to the sequence numbers corresponding to the sub-verification information; generating sets of multicast frames according to the packet length information corresponding to the multiple sub-verification information and the sequence numbers of the multiple sub-verification information.

Furthermore, the present invention discloses a method for receiving the verification information including the following steps: when receiving sets of multicast frames, obtaining the sub-verification information and the sequence numbers of the sub-verification information in sets of multicast frames; obtaining the length of the verification information from the sets of multicast information; when the overall length of the sub-verification information equating to the length of the verification information, recombining the sub-verification information according to the sequence numbers of the sub-verification information, to obtain the verification information.

Preferably, obtaining the sub-verification information and the sequence numbers of the sub-verification information in sets of multicast frames includes: obtaining sets of multicast frames that each set of multicast frames carries identity information; obtaining the sub-verification information and the sequence numbers of the sub-verification information in the sets of multicast information that each set of multicast frames carries identity information.

Preferably, the step of obtaining the sub-verification information and the sequence numbers of the sub-verification information includes: calculating packet length information successively and the sub-verification information in the sets of multicast information; respectively calculating numbers of the sub-verification information based on the packet length information.

Furthermore, the present invention discloses an device for transmitting verification information, includes: a separation module, for separating the verification information into multiple sub-verification information, and numbering the multiple sub-verification information according to the sequence numbers of the multiple sub-verification information in the verification information; a generation module, for generating sets of multicast frames according to the multiple sub-verification information and the sequence numbers of the multiple sub-verification information; a selection module, for selecting one set of multicast frames to be filled with the length of the verification information; a transmission module, for transmitting the sets of multicast frames when overall length of the sub-verification information, in the sets of multicast frames received by a recipient, equating to the length of the identity information in the sets of multicast frames, recombining the sub-verification information according to the sequence numbers of sets of multicast frames to obtain the verification information.

Preferably, the transmission module includes: an adding unit, for adding identity information to the generated sets of multicast frames; a transmission unit, for transmitting the sets of multicast frames after adding identity information into the generated sets of multicast frames; when the recipient receives the identity information from the sets of multicast frames, then obtaining the sub-verification information from the sets of multicast frames and recombining the sub-verification to obtain the verification information according to the sequence numbers of sets of multicast frames carrying the identity information when overall length of the sub-verification information equating to the length of the verification information in the sets of multicast frames.

Preferably, the generation module further includes: a calculating unit, for calculating packet length information successively according to the sequence numbers corresponding to the sub-verification information: a generating unit, for generating sets of multicast frames according to the packet length information.

Furthermore, the present invention discloses an device for receiving the verification information includes: a first obtaining module, for obtaining the sub-verification information and the sequence numbers of the sub-verification information during receiving sets of multicast frames; a second obtaining module, for obtaining the length of the verification information from the selected sets of multicast frames; a recombining module, for recombining the sub-verification information, based on the sequence numbers of the sub-verification information, to obtain verification information when overall length of the sub-verification information equating to the length of the verification information in the sets of multicast frames.

Preferably, the first obtaining module includes: a first obtaining unit, for obtaining sets of multicast frames carrying identity information; a second obtaining unit, for obtaining sub-verification information and sequence numbers of the sub-verification information from the sets of multicast frames carrying identity information.

Preferably, the first obtaining module further includes: a third obtaining unit, for obtaining the sub-verification information and length of the packet in each set of multicast frames; a calculating unit, for calculating the sequence numbers of the sub-verification information based on the packet length information.

The present invention separates the verification information into multiple sub-verification information, numbering the multiple sub-verification information according to the sequence numbers of the multiple sub-verification information in the verification information; generating sets of multicast frames according to the multiple sub-verification information and the sequence numbers of the multiple sub-verification information; selecting one set of multicast frames to be filled with the length of the verification information; transmitting generated sets of multicast frames to a recipient, which enables the sets of multicast frames to send the verification information, the recipients intelligent devices may receive the verification information from the sets of multicast frames. Therefore, other intelligent devices may connect with the router without the verification information entered manually, without the special transport protocol, but by use of the sets of multicast frames of existing Wi-Fi transport protocol sending the verification information may be applicable to most Wi-Fi intelligent devices, to enable the Wi-Fi intelligent devices to access routers quickly and easily.

DETAILED DESCRIPTION OF PREFERRED EMBODIMENTS

It should be understood that the specific embodiments described herein are merely used for describing the present invention, but are not intended to limit the present invention.

Figure 1:
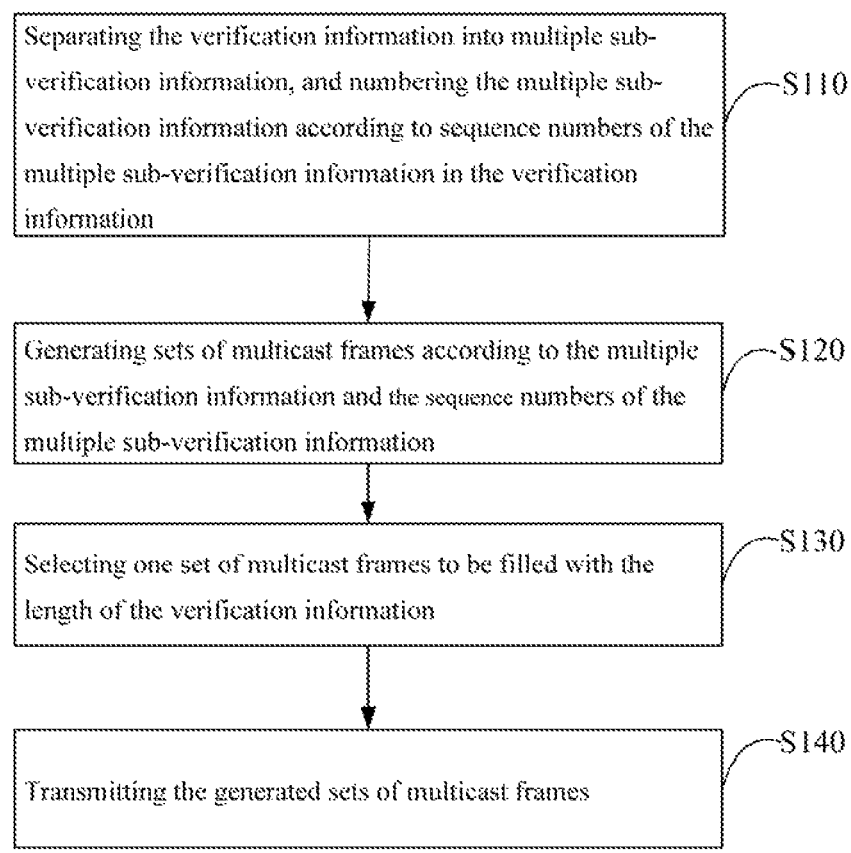
FIG. 1 is a schematic view of the method for transmitting verification information according to the first embodiment of the present invention.

The present invention discloses a method for transmitting verification information FIG. 1 is a schematic view of the method for transmitting verification information according to the first embodiment of the present invention.

In the embodiment, the method for transmitting verification information includes: step S110, separating verification information into multiple sub-verification information, and numbering the multiple sub-verification information according to the sequence numbers of the multiple sub-verification information in the verification information.

In the embodiment, the method for transmitting verification information is applicable for the intelligent terminals such as mobile phones, PAD, intelligent television and so on. The intelligent terminals have screens and/or input keys etc. that is convenient for inputting/displaying instructions. In which, the intelligent terminals store the verification information corresponding to the Wi-Fi module of the wireless router.

In which, the above verification information for accessing, include a Wi-Fi account (SSID) and a Wi-Fi password, as well as encryption methods corresponding to the Wi-Fi password.

Specifically, in the embodiment of the present invention, the intelligent terminal sends multicast frames in a local area network system, carrying the Wi-Fi verification information into the multicast address, then sending out the multicast. A multicast frame includes a retry bit, an address and a length. The address includes 6 bytes, and the first three bytes are a fixed set of 01 00 5E, the fourth to tenth and eleventh to twelfth thereafter are the same to low 23 bytes of IP address.

As a result, we can transmit out data information included in the multicast, by address realm of the multicast, i.e. by effective information carried in the low 23 bytes of IP address. Since the 23 bytes of IP address carries limited information, two bytes of data every time, it's necessary to group the verification information, two bytes of data every time.

As a result, the intelligent terminals may separate the verification information into multiple sub-verification information, and numbering the multiple sub-verification information according to a sequence of the multiple sub-verification information in the verification information. In other embodiments, before the step S110, the method for transmitting verification information further includes encrypting the verification information to improve safety of the verification information. Later in step S110, separating the encrypted verification information into multiple sub-verification information.

Step S120, generating sets of multicast frames according to the multiple sub-verification information and the sequence numbers of the multiple sub-verification information.

In the embodiment, the intelligent terminal calculates packet length information successively according to the sequence numbers corresponding to the sub-verification information. In which, the packet length information L may be calculated by the formula according to the sequence number index:

$$L=(\text{Index}/16)*16+8$$

then the intelligent terminal may successively generate sets of multicast frames according to the sub-verification information and the packet length information L corresponding to the sub-verification information. Specifically, the low 23 bytes of IP address which are corresponding to the sequence numbers of the sub-verification information, are filled up with each sub-verification information, by the intelligent terminals. The packet length information of the sets of multicast frames corresponding to the sequence numbers of the sub-verification information is the packet length information L corresponding to the numbers of the sub-verification information, by using the above formula, the packet length information L corresponding to the numbers of sub-verification information is calculated to avoid mistakes due to different lengths of data packets transmitted/received in different Wi-Fi systems, to improve compatibility of the method according to the embodiment of the present invention.

Step S130: selecting one set of multicast frames to be filled with the length of the verification information.

The intelligent terminal may select one set of multicast frames, then filling the set of multicast frames with the length of the verification information. For instance, the low seven bytes from the fourth byte in the address of the selected set of multicast frames as a special field represent the overall length of the transmitted verification information. Of course, in the embodiments, the low seven bytes from the fourth byte in the address of the selected set of multiple frames as a special field represent the sequence numbers of the sub-verification information in the transmitted verification information. If the sub-verification information is marked from 1, the number of the sub-verification information is the maximum value.

Step S140: transmitting the generated sets of multicast frames when overall length of the sub-verification information, in the sets of multicast frames received by a recipient, equating to the length of the verification information in the sets of multicast frames, recombining the sub-verification information according to the sequence numbers of sets of multicast frames to obtain the verification information.

In the embodiment, the intelligent terminal transmits the generated sets of multicast frames. The intelligent devices including a refrigerator, a washing machine, an air conditioner and so on, may receive the sets of multicast frames transmitted from the intelligent terminal. Of course, the sets of multicast frames transmitted from the intelligent terminal can be transferred via a router to a recipient including a refrigerator, a washing machine, an air conditioning and so on. After receiving the sets of multicast frames, when overall length of the sub-verification information, in the sets of multicast frames received by a recipient, equating to the length of the identity information in the sets of multicast frames, recombining the sub-verification information according to the sequence numbers of sets of multicast frames to obtain the verification information.

In the embodiment, the present invention separates the verification information into multiple sub-verification information, numbering the multiple sub-verification information according to the sequence numbers of the multiple sub-verification information in the verification information; generating sets of multicast frames according to the multiple sub-verification information and the sequence numbers of the multiple sub-verification information; selecting one set of multicast frames to be filled with the length of the verification information; transmitting generated sets of multicast frames to a recipient, which enables the sets of multicast frames to send the verification information, the recipient's intelligent devices may receive the verification information from the sets of multicast frames. Therefore, other intelligent devices may connect with the router without the verification information entered manually, without the special transport protocol, but by use of the sets of multicast frames of existing Wi-Fi transport protocol sending the verification information may be applicable to most Wi-Fi intelligent devices, to enable the Wi-Fi intelligent devices access routers quickly and easily.

Figure 2:
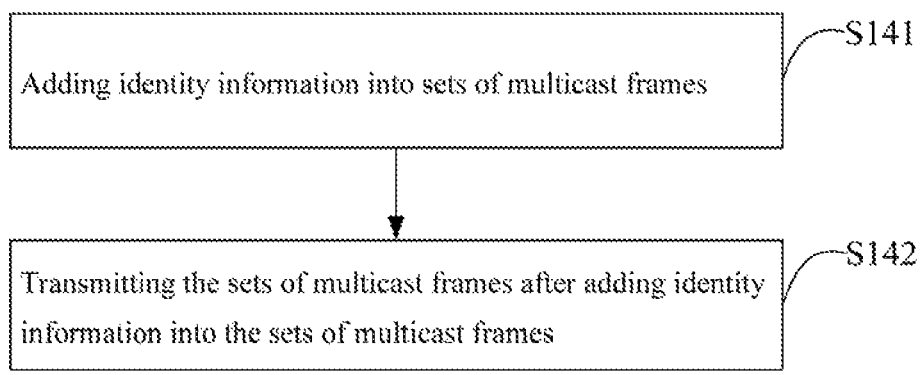
FIG. 2 is a schematic view of the method for transmitting verification information according to the second embodiment of the present invention.

The second embodiment of the method for transmitting verification information is disclosed based on the first embodiment of the present invention. With reference to FIG. 2, the Step S140 includes:

Step S141, adding identity information to the generated sets of multicast frames; in which the identity information is used for identifying the sub-verification information carried in sets of multicast frames, which is beneficial for the intelligent devices to obtain the sub-verification information and sequence numbers of the sub-verification information from the sets of multicast frames carrying the identity information.

Step S142, transmitting the sets of multicast frames after adding identity information, when the recipient receives the identity information from the sets of multicast frames, then obtaining the sub-verification information from the sets of multicast frames and when overall length of the sub-verification information equating to the length of the verification information in the sets of multicast frames, recombining the sub-verification to obtain the verification information according to the sequence numbers of sets of multicast frames carrying the identity information.

In embodiments of the present invention, by adding identity information to the generated sets of multicast frames and transmitting the sets of multicast frames after adding identity information, when the recipient receives the identity information from the sets of multicast frames, then obtaining the sub-verification information from the sets of multicast frames and when overall length of the sub-verification information equating to the length of the verification information in the sets of multicast frames, recombining the sub-verification information according to the sequence numbers of sets of multicast frames carrying the identity information, to obtain the verification information, which enables the sets of multicast frames to send the verification information, the recipients intelligent devices may receive the verification information from the sets of multicast frames. The aforementioned embodiment realizes sets of multicast information carrying the sub-verification information to be added by identity information. Therefore, the accuracy of obtaining the sub-verification information and the sequence numbers is improved, as well as convenience and rapidity of the Wi-Fi intelligent devices accessing routers.

Figure 3:
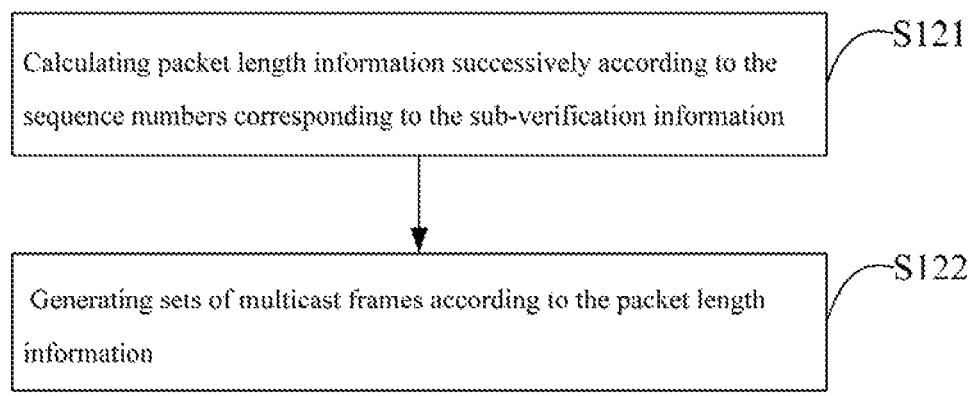
FIG. 3 is a schematic view of each of sets of transmitting frames filling up with the multiple sub-verification information and the sequence numbers of the multiple sub-verification information according to the third embodiment of the present invention.

With reference to FIG. 3, the third embodiment discloses a method for transmitting verification information based on the first embodiment of the present invention, in which, the step S120 includes:

Step S121: calculating packet length information successively according to the sequence numbers corresponding to the sub-verification information.

In the embodiment of the present invention, the packet length L of sets of multicast frames may be calculated by the formula hereinafter according to the sequence number index:

$$L=(Index/16)*16+8$$

Step S122: generating sets of multicast frames according to the multiple sub-verification information and the sequence numbers of the multiple sub-verification information.

Specifically, the intelligent terminal enables low 23 bytes of the address realm of the multicast corresponding to the sequence numbers of the sub-verification information, to fill up with the sub-verification information. The packet length information of sets of multicast frames corresponding to the sequence numbers of the sub-verification information is the packet length information L corresponding to the sequence numbers of the sub-verification information.

In the embodiment, calculating packet length information successively according to the sequence numbers corresponding to the sub-verification information, then successively generating sets of multicast frames according to the sub-verification information and the sequence numbers corresponding to the sub-verification information, which realizes generating sets of multicast frames according to the sub-verification and the packet length information. Therefore, the intelligent devices may obtain the sub-verification information and sequence numbers by receiving the sets of multicast frames, so as to improve the accuracy of obtaining the sub-verification information and sequence numbers, as well as convenience and rapidity of the Wi-Fi intelligent devices accessing routers.

Furthermore, the present invention discloses a method for receiving verification information.

Figure 4:
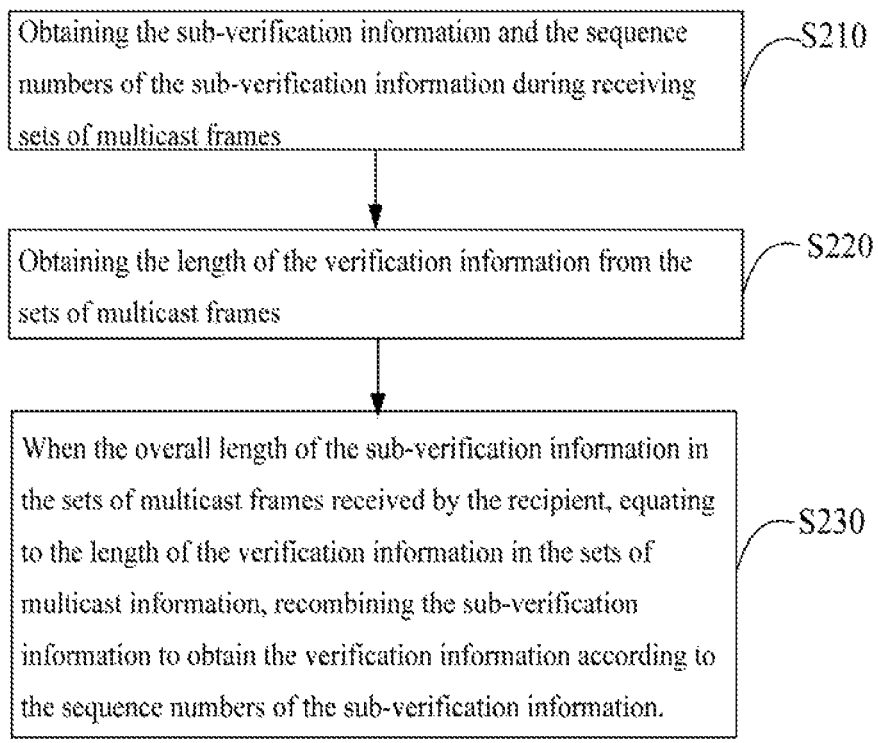
FIG. 4 is a flowchart of the method for receiving verification information according to the first embodiment of the present invention.

With reference to FIG. 4, FIG. 4 is a flowchart of the method for receiving verification information according to the first embodiment of the present invention;

In the embodiment, the method for receiving verification information includes:

Step S210: when receiving sets of multicast frames, obtaining the sub-verification information and the sequence numbers of the sub-verification information in sets of multicast frames.

In the embodiment, the intelligent device receives the data information the low 23 bytes of IP address in sets of multicast frames. The data information is the sub-verification information. The packet length L of each set of multicast frames is obtained. Then the sequence number corresponding to each sub-verification is calculated by the formula hereinafter:

$$L=(Index/16)*16+8$$

Step S220: obtaining the length of the verification information from the sets of multicast information;

the low seven bytes from the fourth byte in the address of the selected set of multiple frames as a special field are obtained by the intelligent device. The information on the special field is the length value of the verification information. Of course, the low seven bytes from the fourth byte in the address of the selected set of multiple frames as a special field may represent the sequence numbers of the sub-verification information in the transmitted verification information. The information on the special field is the sequence numbers of the sub-verification information.

Step S230: recombining the sub-verification information, based on the sequence numbers of the sub-verification information, to obtain verification information when overall length of the sub-verification information equals to the length of the verification information.

In the embodiment, when overall length of the sub-verification information equals to the length of the verification information, or when the overall number of the sub-verification information equals to the number of the sub-verification information, recombining the sub-verification information according to the sequence numbers of the sub-verification information, to obtain the verification information.

Furthermore, in other embodiments, if the verification information is encrypted before separation, after recombining the verification information according to the sequence numbers of sets of the sub-verification information, the recombined verification information have to be decrypted to obtain the verification information.

Furthermore, in other embodiments, after step S240, the method for receiving the verification information further includes: accessing the router corresponding to the verification information. That means, the intelligent device connects Wi-Fi based on the recombined verification information.

In the embodiment, when receiving sets of multicast frames, obtaining the sub-verification information and the sequence numbers of the sub-verification information in sets of multicast frames, then obtaining the length of the verification information from the sets of multicast information, when the overall length of the sub-verification information equals to the length of the verification information, recombining the sub-verification information, based on the sequence numbers of the sub-verification information, to obtain verification information, which enables the intelligent device obtains verification information by receiving the sets of multicast frames, the intelligent device may access the router without the verification information entered manually, and but by the existing Wi-Fi transport protocol, the way of the sets of multicast frames transmitting verification information may be applicable to most Wi-Fi intelligent devices, to enable the Wi-Fi intelligent devices to access routers quickly and easily.

Figure 5:
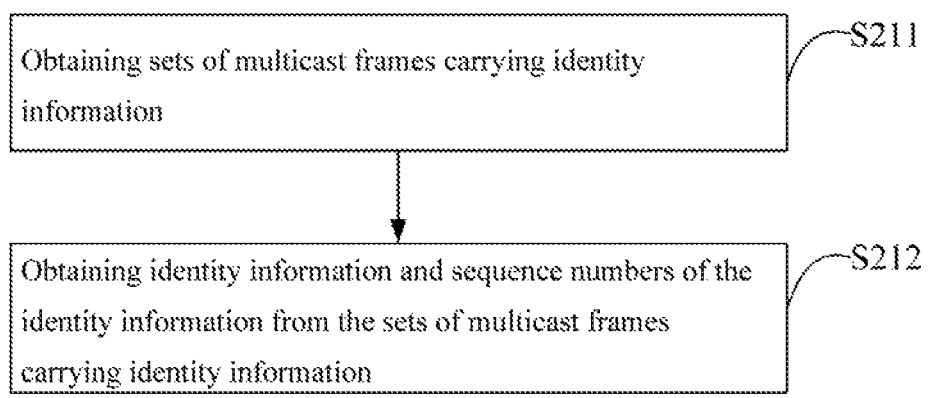
FIG. 5 is a schematic view of the step of obtaining sub-verification information and the sequence numbers of the sub-verification information of the method for receiving verification information according to the second embodiment of the present invention.

The second embodiment is disclosed according to the first embodiment of the present invention, with reference to FIG. 5. In the second embodiment, step S210 includes:

step S211: obtaining sets of multicast frames carrying identity information.

In the second embodiment, each set of multicast frames carrying identity information, when receiving sets of multicast frames, the intelligent device may obtain the sets of multicast frames first that carries identity information. The identity information thereof may be used for identifying the current sets of multicast frames carrying sub-verification information, enabling other intelligent devices to obtain the sub-verification information and sequence numbers from the sets of multicast frames carrying identity information.

Step S212: obtaining the sub-verification information and sequence numbers of the sub-verification information from the sets of multicast frames carrying identity information.

In the embodiments, the sets of multicast frames can be transmitted by a sender's intelligent devices or be transferred by the router. If the sets of multicast frames are transferred by the router, since several channels of the router scan simultaneously to receive data, if the sets of multicast frames received by the router are carrying identity information, the router locks the current channel to receive all the sets of multicast frames, then transfer the sets of multicast frames.

In the embodiment, receiving sets of multicast frames carrying the identity information, then obtaining the sub-verification information and sequence numbers of the sub-verification information from received sets of multicast frames, which may avoid the intelligent device resolving the sets of multicast frames without carrying identity information, to improve efficiency of the intelligent device obtaining the sub-verification information and sequence numbers of the sub-verification information, further to enable the Wi-Fi intelligent device to access routers quickly and easily.

Figure 6:
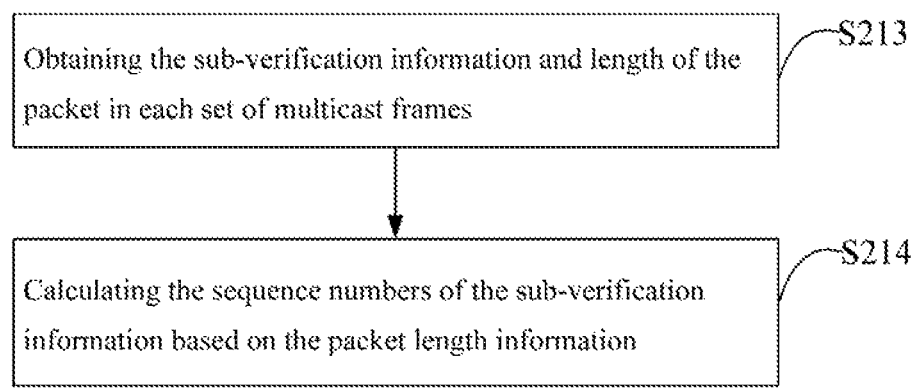
FIG. 6 is a schematic view of the step of obtaining sub-verification information and the sequence numbers of the sub-verification information of the method for receiving verification information according to the third embodiment of the present invention.

The third embodiment of the method for receiving verification information is disclosed according to the first embodiment, with reference to FIG. 6. In the third embodiment, step S210 includes:

step S213: obtaining the sub-verification information and length of the packet in each set of multicast frames;

step S214: calculating the sequence numbers of the sub-verification information based on the packet length information.

In the embodiment, the sequence number corresponding to each sub-verification may be calculated by the formula hereinafter:

$$L=(\text{Index}/16)*16+8$$

In the embodiment, based on the sub-verification information in sets of multicast frames and packet length information, calculating to obtain sequence numbers of the sub-verification information successively, which enables the intelligent devices to obtain the sequence numbers of the sub-verification information, improving the accuracy of obtaining the sub-verification information and numbers, as well as improving convenience and rapidity of the Wi-FI intelligent devices to access routers.

The present invention further discloses an device for transmitting verification information.

Figure 7:
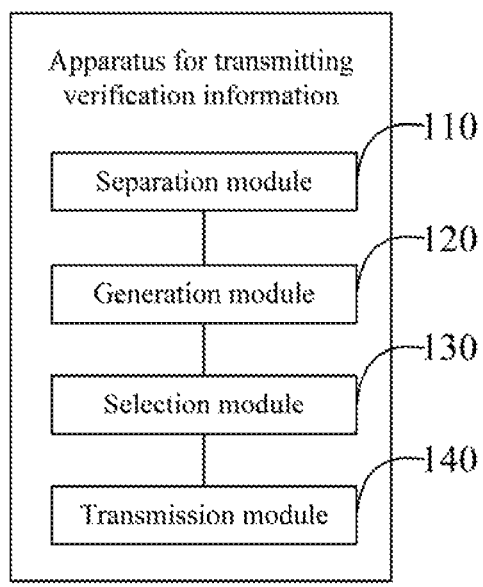
FIG. 7 is a functional module block of the device for transmitting verification information according to the first embodiment of the present invention.

With reference to FIG. 7, FIG. 7 is a functional module block of the device for transmitting verification information according to the first embodiment of the present invention.

In the embodiment, a device for transmitting verification information includes a processor and a memory. In where the processor executes instructions stored in the memory to implement:

a separation module 110, for separating the verification information into multiple sub-verification information, and numbering the multiple sub-verification information according to the sequence numbers of the multiple sub-verification information in the verification information.

In the embodiment, the separation module 110 sends multicast frames in a local area network system, carrying the Wi-Fi verification information into the multicast address, then sending out the multicast. A multicast frame includes a retry bit, an address and a length. The address includes 6 bytes, and the first three bytes are a fixed set of 01 00 5E, the fourth to tenth and eleventh to twelfth thereafter are the same to low 23 bytes of IP address.

Therefore, we can transmit out data information included in the multicast, by address realm of the multicast, i.e. by effective information carried in the low 23 bytes of IP address. Since the 23 bytes of IP address carries limited information, two bytes of data every time, its necessary to group the verification information, two bytes of data every time.

Therefore, the separation module 110 is configured for separating verification information into multiple sub-verification information, and numbering the multiple sub-verification information according to the sequence numbers of the multiple sub-verification information in the verification information.

In which, the aforementioned verification information includes Wi-Fi account and Wi-Fi password, as well as the encryption method related to the Wi-Fi password.

The generation module 120, is configured for generating sets of multicast frames according to the sub-verification information and the sequence numbers of the multiple sub-verification information;

In the embodiment, the generation module 120 calculates packet length information successively according to the sequence numbers corresponding to the sub-verification information, in which, the packet length information L may be calculated by the formula hereinafter:

$$L=(\text{Index}/16)*16+8$$

then the intelligent terminal generates sets of multicast frames according to the multiple sub-verification information and the packet length information L corresponding to sequence numbers of the multiple sub-verification information. Specifically, the low 23 bytes of IP address which are corresponding to the sequence numbers of the sub-verification information, are filled up with each sub-verification information, by the intelligent terminals. The packet length information of the sets of multicast frames corresponding to the sequence numbers of the sub-verification information is the packet length information L corresponding to the numbers of the sub-verification information, by using the above formula, the packet length information L corresponding to the sequence numbers of sub-verification information is calculated to avoid mistakes due to different lengths of data packets transmitted/received in different Wi-Fi systems, to improve compatibility of the method according to the embodiment of the present invention.

The selection module 130, is configured for selecting one set of multicast frames to be filled with the length of the verification information;

the selection module 130 may select one set of multicast frames then to be filled with the length of the verification information. For instance, the low seven bytes from the fourth byte in the address of the selected set of multiple frames as a special field represent the overall length of the transmitted verification information.

Of course, the low seven bytes from the fourth byte in the address of the selected set of multiple frames as a special field may represent the number of the sub-verification information in the transmitted verification information. The information on the special field is the number of the sub-verification information. If the sub-verification information is marked from 1, the number of the sub-verification information is the maximum value.

The transmission module 140, is configured for transmitting the sets of multicast frames when overall length of the sub-verification information, in the sets of multicast frames received by a recipient, equals to the length of the identity information in the sets of multicast frames, recombining the sub-verification information according to the sequence numbers of sets of multicast frames to obtain the verification information.

In the embodiment, the transmission module 140 transmits the generated sets of multicast frames. The intelligent devices including a refrigerator, a washing machine, an air conditioner and so on may receive the sets of multicast frames transmitted from the intelligent terminal. Of course, the sets of multicast frames transmitted from the intelligent terminal can be transferred via a router to a recipient including a refrigerator, a washing machine, an air conditioning and so on. After receiving the sets of multicast frames, when overall length of the sub-verification information, in the sets of multicast frames received by a recipient, equals to the length of the identity information in the sets of multicast frames, recombining the sub-verification information according to the sequence numbers of sets of multicast frames to obtain the verification information.

In other embodiments, the separation module 110 may perform encryption of the verification information before separating the verification information into multiple sub-verification information, so as to improve the safety of the verification information, and then separating the encrypted verification information into multiple sub-verification information In the embodiment, the separation module 110 is configured for separating verification information into multiple sub-verification information, and numbering the multiple sub-verification information according to the sequence numbers of the multiple sub-verification information in the verification information. Then the generation module 120 generates sets of multicast frames according to the multiple sub-verification information and numbers of the sub-verification information. Next, the selection module 130 selects one set of multicast frames to be filled with the length of the verification information. At last, the transmission module 140 sends generated sets of multicast frames to a recipient, which enables the sets of multicast frames to send the verification information and the recipient's intelligent devices may receive the verification information from the sets of multicast frames. Therefore, other intelligent devices may connect with the router without the verification information entered manually, without the special transport protocol, but by use of the sets of multicast frames of existing Wi-Fi transport protocol sending the verification information may be applicable to most Wi-Fi intelligent devices, to enable the Wi-Fi intelligent devices to access routers quickly and easily.

Figure 8:
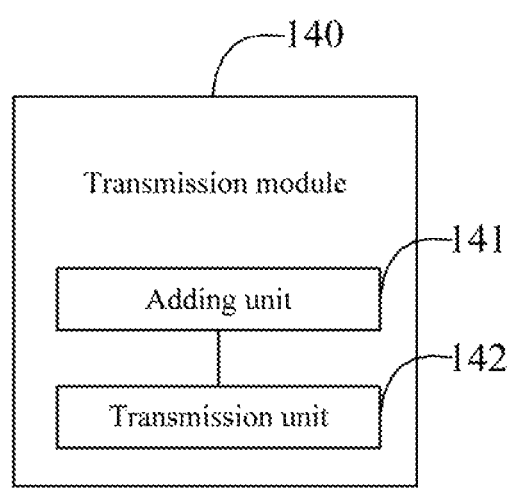
FIG. 8 is a functional module block of the transmission module in the device for transmitting verification information according to the second embodiment of the present invention.

The second embodiment is related to the device for transmitting verification information based on the first embodiment, with reference to FIG. 8. In the second embodiment, the transmission module 140 includes:

an adding unit 141, is configured for adding identity information to the generated sets of multicast frames;

in which, the aforementioned identity information may be used for identifying the current sets of multicast frames carrying sub-verification information, for other intelligent devices to obtain the sub-verification information and sequence numbers from the sets of multicast frames carrying identity information.

A transmission unit 142, is configured for transmitting the sets of multicast frames thereof after adding identity information into the generated sets of multicast frames. When the recipient receives the identity information from the sets of multicast frames, then obtaining the sub-verification information from the sets of multicast frames and recombining the sub-verification to obtain the verification information according to the sequence numbers of sets of multicast frames carrying the identity information when overall length of the sub-verification information equals to the length of the verification information in the sets of multicast frames.

In the embodiment, the adding unit 141 adds identity information to the generated sets of multicast frames. Then the transmission unit 142 transmits the sets of multicast frames after adding identity information thereto. When the recipient receives the sub-verification information carrying identity information and the overall length of the sub-verification information equals to the length of the verification information, recombining the sub-verification information according to the sequence numbers of sets of multicast frames to obtain the verification information, which may realize to add identity information to the generated sets of multicast frames. Therefore, when the intelligent device receives sets of multicast frames, the intelligent device may obtain the sub-verification information carrying identity information and the sequence numbers, thus improving the accuracy of obtaining the sub-verification information and sequence numbers, as well as improving convenience and rapidity of the Wi-FI intelligent devices to access routers.

Figure 9:
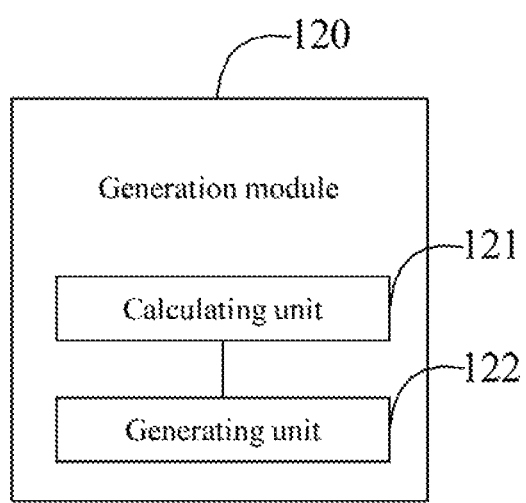
FIG. 9 is a functional module block of the transmission module in the device for transmitting verification information according to the third embodiment of the present invention.

The third embodiment relates to the device for transmitting verification information based on the first embodiment, with reference to FIG. 9, in the third embodiment, the generation module 120 includes:

a calculating unit 121, for calculating packet length information successively according to the sequence numbers corresponding to the sub-verification information.

In the third embodiment, the packet length L of sets of multicast frames may be calculated by the formula hereinafter:

$$L=(\text{Index}/16)*16+8$$

a generating unit 122, is configured for generating sets of multicast frames according to the sub-verification information and the packet length information corresponding to the sequence numbers of the sub-verification.

Specifically, the intelligent device fills the sub-verification information into the low 23 bytes of IP address in sets of multicast frames. The packet length information in the sets of multicast frames corresponding to the sequence numbers of the sub-verification information is the packet length L corresponding to the sequence numbers of the sub-verification information.

In the third embodiment, the calculating unit 121 calculates packet length information successively according to the sequence numbers corresponding to the sub-verification information. Then the generating unit 122 generates sets of multicast frames according to the sub-verification information and the packet length information corresponding to the sequence number of the sub-verification information. That means, based on the sub-verification information and packet length information, generating sets of multicast frames may be realized, enabling the intelligent devices to obtain the sequence numbers of the sub-verification information and sequence numbers according to the generated sets of multicast frames, further improving the accuracy of obtaining the sub-verification information and numbers, as well as improving convenience and rapidity of the Wi-Fi intelligent devices to access routers.

The present invention further discloses an device for receiving verification information.

Figure 10:
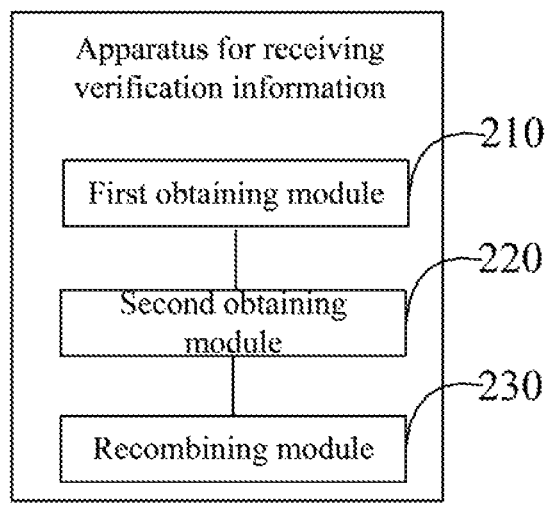
FIG. 10 is a functional module block of the device for receiving verification information according to the first embodiment of the present invention.

With reference to FIG. 10, FIG. 10 is a function module block of the device for receiving verification information according to the first embodiment of the present invention.

In the embodiment, the device for receiving verification information includes a processor and a memory. In which, the processor executes instructions stored in the memory to implement:

a first obtaining unit 210 is configured for obtaining sets of multicast frames carrying identity information.

In the embodiment, when receiving the sets of multicast frames, the first obtaining unit 210 obtains the data information of the low 23 bytes of IP address of each set of multicast frames, the data information is the sub-verification information, then obtaining the packed length L of each set of multicast frames. The sequence number of each set of multicast frames may be calculated by the formula hereinafter:

$$L=(Index/16)*16+8$$

The second obtaining unit 220 is configured for obtaining identity information and sequence numbers of the identity information from the sets of multicast frames carrying identity information.

The second obtaining unit 220 obtains the low seven bytes from the fourth byte in the address of the selected set of multiple frames as a special field represents the number of the sub-verification information in the transmitted verification information. The information is the number of the sub-verification information.

The recombining module 230 is configured for recombining the sub-verification information, based on the sequence numbers of the sub-verification information, to obtain verification information when overall length of the sub-verification information equals to the length of the verification information in the said sets of multicast frames.

In the embodiment, when the overall length of the sub-verification information equals to the length of the verification information, or the number of obtained verification information equals to the aforementioned number, the recombining module 230 performs recombination of the sub-verification information based on the sequence numbers of the sub-verification information, to obtain the verification information.

Furthermore, in other embodiments, if the verification information is encrypted before separation, after the recombining module 230 performs recombination of the verification information according to the sequence numbers of sets of the sub-verification information, the recombined verification information have to be decrypted to obtain the verification information.

In the embodiment, when receiving sets of multicast frames, the first obtaining module 210 obtains the sub-verification information and the sequence numbers of the sub-verification information in sets of multicast frames, then the second obtaining module 220 obtains the length of the verification information from the sets of multicast information. Next when the overall length of the sub-verification information equals to the length of the verification information, the recombining module 240 performs recombination of the sub-verification information, based on the sequence numbers of the sub-verification information, to obtain verification information, which enables the intelligent device obtains verification information by receiving the sets of multicast frames, the intelligent device may access the router without the verification information entered manually, and but by the existing Wi-Fi transport protocol, the way of the sets of multicast frames transmitting verification information may be applicable to most Wi-Fi intelligent devices, to enable the Wi-Fi intelligent devices to access routers quickly and easily.

Figure 11:
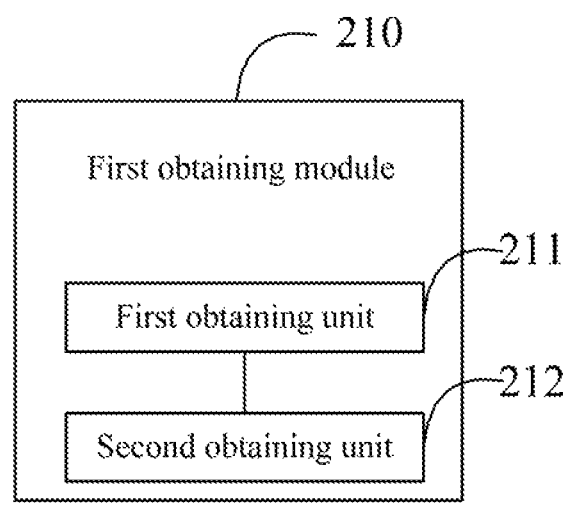
FIG. 11 is a functional module block of the first obtaining module of the device for receiving verification information according to the second embodiment of the present invention.

The second embodiment relates to the device for receiving verification information based on the first embodiment, with reference to FIG. 11, in the second embodiment, the first obtaining module 210 includes the first obtaining unit 211 is configured for obtaining sets of multicast frames carrying identity information.

In the embodiment, each set of multicast frames carries identity information, when receiving sets of multicast frames, the first obtaining unit 211 obtains sets of multicast frames carrying identity information. The identity information thereof may be used for identifying the current sets of multicast frames carrying sub-verification information, enabling other intelligent devices to obtain the sub-verification information and sequence numbers from the sets of multicast frames carrying identity information.

The second obtaining unit 212, is configured for obtaining identity information and sequence numbers of the identity information from the sets of multicast frames carrying identity information.

In the embodiment, the sets of multicast frames can be transmitted by a sender's intelligent devices or be transferred by the router. If the sets of multicast frames are transferred by the router, since several channels of the router scan simultaneously to receive data, if the sets of multicast frames received by the router are carrying identity information, the router locks the current channel to receive all the sets of multicast frames, then transfer the sets of multicast frames.

In the embodiment, by receiving sets of multicast frames carrying the identity information, then obtaining the sub-verification information and sequence numbers of the sub-verification information from the sets of multicast frames carrying the identity information, which may avoid the intelligent device resolving the sets of multicast frames without carrying identity information, to improve efficiency of the intelligent device obtaining the sub-verification information and sequence numbers of the sub-verification information, further to enable the Wi-Fi intelligent device to access routers quickly and easily.

Figure 12:
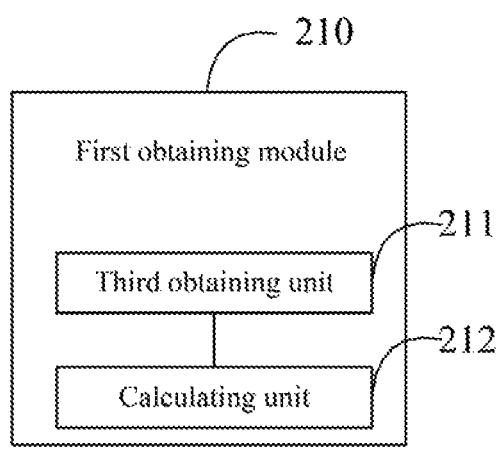
FIG. 12 is a functional module block of the first obtaining module of the device for receiving verification information according to the third embodiment of the present invention.

The third embodiment relates to the device for receiving verification information based on the first embodiment, with reference to FIG. 12, in the third embodiment, the first obtaining module 210 further includes:

a third obtaining unit 213 is configured for obtaining the sub-verification information and packet length in each set of multicast frames;

a calculating unit 214, for calculating the sequence numbers of the sub-verification information based on the packet length information.

In the third embodiment, the sequence number of each sub-verification information may be calculated by the formula hereinafter:

$$L=(\text{Index}/16)*16+8$$

In the embodiment, the third obtaining unit 213 obtains the sub-verification information and the packet length, then the calculating unit 214 calculates the sequence numbers of the sub-verification information based on the packet length information, to enable the intelligent devices to obtain the sequence numbers corresponding to each sub-verification information accurately, to improve efficiency of the intelligent device obtaining the sub-verification information and sequence numbers of the sub-verification information, further to enable the Wi-Fi intelligent device to access routers quickly and easily.

Furthermore, it is apparent to those skilled in the art that the present invention also provides a device for transmitting verification information, the device comprising a non-transitory program storage medium and one or more processors. The non-transitory program storage medium stores instructions executable by the processor(s) to perform the methods as described above. Furthermore, it is apparent to those skilled in the art that various units or modules 110,120,130, 140,141,142,121,122,210,220,230,211,212,213, and 214, as shown in FIGS. 1-12, can be software modules or software units. In another aspect, it is well-known that various software modules or software units can be inherently stored in the non-transitory program storage medium and executed by the processor(s).

The foregoing descriptions are merely embodiments of the present invention, and are not intended to limit the scope of the present invention. An equivalent structural or equivalent process alternation made by using the content of the specification and drawings of the present invention, or an application of the content of the specification and drawings directly or indirectly to another related technical field, shall fall within the protection scope of the present invention.

I claim:

1. A method for transmitting verification information, comprising:
    separating the verification information into multiple sub-verification information, and numbering the multiple sub-verification information according to sequence numbers of the multiple sub-verification information in the verification information;
    calculating each of multiple pieces of packet length information according to each of the sequence numbers corresponding to the multiple sub-verification information;
    generating sets of multicast frames according to the multiple sub-verification information and the multiple pieces of packet length information corresponding to the sequence numbers of the multiple sub-verification information; wherein, each of the multiple pieces of packet length information is a packet length of each of the sets of multicast frames;
    selecting one set of multicast frame from the sets of multicast frames, and encapsulating a length of the verification information in the one set of multicast frame selected;
    transmitting the generated sets of multicast frames, wherein, on condition that an overall length of the multiple sub-verification information in the sets of multicast frames received by a recipient is equal to the length of the verification information in the one set of multicast frame selected, recombining the multiple sub-verification information according to the sequence numbers of the generated sets of multicast frames to obtain the verification information.

2. The method for transmitting verification information of claim 1, wherein transmitting sets of multicast frames comprises:
    adding identity information into sets of multicast frames;
    transmitting the sets of multicast frames after adding the identity information into the sets of multicast frames; on condition that the recipient receives the identity information from the sets of multicast frames, then obtaining the multiple sub-verification information from the sets of multicast frames carrying the identity information; and on condition that the overall length of the multiple sub-verification information is equal to a length of the identity information in the sets of multicast frames, recombining the multiple sub-verification information to obtain the verification information according to sequence numbers of the sets of multicast frames carrying the identity information.

3. The method for transmitting verification information of claim 1, wherein, each of the multiple pieces of packet length information is calculated by a formula:

$$L=(\text{Index}/16)*16+8$$

wherein, Index is each of the sequence numbers, L is each of the multiple pieces of packet length information.

4. A method for receiving verification information comprising:
    on condition that receiving sets of multicast frames, obtaining multiple pieces of packet length information and multiple sub-verification information in the sets of multicast frames, and calculating each of sequence numbers of the multiple sub-verification information based on each of the multiple pieces of packet length information,
    obtaining a length of the verification information from a selected set of multicast frames of the received sets of multicast frames,
    on condition that an overall length of the multiple sub-verification information received by a recipient is equal to the length of the verification information in the sets of multicast frames, recombining the multiple sub-verification information to obtain the verification information according to the sequence numbers of the multiple sub-verification information.

5. The method for receiving verification information according to claim 4, wherein obtaining multiple sub-verification information and sequence numbers of the multiple sub-verification information in sets of multicast frames comprises:
    obtaining the sets of multicast frames that each set of multicast frames carries identity information;

obtaining the multiple sub-verification information and the sequence numbers of the multiple sub-verification information in the sets of multicast frames that each set of multicast frames carries the identity information.

6. The method for receiving verification information according to claim 4, wherein, each of the sequence numbers of the multiple sub-verification information is calculated by a formula:

$$L=(Index/16)*16+8$$

wherein, L is each of the multiple pieces of packet length information, Index is each of the sequence numbers.

7. A device for transmitting verification information comprising:
a processor; and
a memory;
wherein the processor executes instructions stored in the memory to implement:
a separation module is configured for separating the verification information into multiple sub-verification information, and numbering the multiple sub-verification information according to sequence numbers of the multiple sub-verification information in the verification information;
a generation module is configured for calculating each of multiple pieces of packet length information according to each of the sequence numbers corresponding to the multiple sub-verification information, and generating sets of multicast frames according to the multiple sub-verification information and the multiple pieces of packet length information corresponding to the sequence numbers of the multiple sub-verification information; wherein, each of the multiple pieces of packet length information is a packet length of each of the sets of multicast frames;
a selection module is configured for selecting one set of multicast frame from the sets of multicast frames, and encapsulating a length of the verification information in the one set of multicast frame selected;
a transmission module is configured for transmitting the sets of multicast frames on condition that an overall length of the multiple sub-verification information in the sets of multicast frames received by a recipient is equal to the length of the verification information in the one set of multicast frame selected, recombining the multiple sub-verification information to obtain the verification information according to the sequence numbers of the multiple sub-verification information.

8. The device for transmitting verification information according to claim 7, wherein the transmission module further comprising:
an adding unit is configured for adding identity information to the sets of multicast frames;
a transmission unit is configured for transmitting, the sets of multicast frames thereof after adding the identity information into the sets of multicast frames; on condition that the recipient receives the identity information from the sets of multicast frames, then obtaining the multiple sub-verification information from the sets of multicast frames carrying the identity information, and on condition that an overall length of the multiple sub-verification information is equal to a length of the identity information in the sets of multicast frames, recombining the multiple sub-verification to obtain the verification information according to the sequence numbers of the sets of multicast frames carrying the identity information.

9. The device for transmitting verification information according to claim 7, wherein, each of the multiple pieces of packet length information is calculated by a formula:

$$L=(Index/16)*16+8$$

wherein, Index is each of the sequence numbers, L is each of the multiple pieces of packet length information.

10. A device for receiving verification information comprising:
a processor, and
a memory;
wherein the processor executes instructions stored in the memory to implement:
a first obtaining module, is configured for obtaining multiple pieces of packet length information and multiple sub-verification information in the sets of multicast frames, and calculating each of sequence numbers of the multiple sub-verification information based on each of the multiple pieces of packet length information;
a second obtaining module, is configured for obtaining a length of the verification information from a selected set of multicast frame of the received sets of multicast frames;
a recombining module, for on condition that an overall length of the multiple sub-verification information in the sets of multicast frames received by a recipient is equal to the length of the verification information in the sets of multicast frames, recombining the multiple sub-verification information to obtain the verification information according to the sequence numbers of the multiple sub-verification information.

11. The device for receiving verification information according to claim 10, wherein, the first obtaining module further comprising
a first obtaining unit is configured for obtaining sets of multicast frames carrying identity information,
a second obtaining unit is configured for obtaining the multiple sub-verification information and the sequence numbers of the multiple sub-verification information from the sets of multicast frames carrying the identity information.

12. The device for receiving verification information according to claim 10, wherein, each of the sequence numbers of the multiple sub-verification information is calculated by a formula:

$$L=(Index/16)*16+8$$

wherein, L is each of the multiple pieces of packet length information, Index is each of the sequence numbers.

* * * * *